United States Patent

[11] 3,572,035

[72] Inventors John Edward Beroset
 Alsace Township, Berks Co., Pa.;
 Francis Joseph Fuchs, Jr., Princeton
 Junction, N.J.
[21] Appl. No. 812,205
[22] Filed Apr. 1, 1969
[45] Patented Mar. 23, 1971
[73] Assignee Western Electric Company Incorporated
 New York, N.Y.

[54] FRICTION COMPENSATOR
 7 Claims, 3 Drawing Figs.

[52] U.S. Cl. .................................................. 60/54.6,
 92/171
[51] Int. Cl. ................................................... F15b 7/00
[50] Field of Search ......................................... 60/54, 516
 (HA), 10.5; 92/51, 161; 91/419

[56] References Cited
 UNITED STATES PATENTS

| | | | |
|---|---|---|---|
| 2,032,185 | 2/1936 | Sciaky | 60/54.5HA |
| 2,058,377 | 10/1936 | Francis | 60/54.5HAX |
| 2,351,872 | 6/1944 | Parker | 60/54.5HA |
| 2,608,059 | 8/1952 | Kux | 60/54.5HA |
| 2,656,745 | 10/1953 | Forichon | 60/54.5HAX |
| 2,774,217 | 12/1956 | Ashton | 60/54.5HA |
| 2,827,766 | 3/1958 | Hufford | 60/54.5HA |

Primary Examiner—Martin P. Schwadron
Assistant Examiner—A.M. Zupcic
Attorneys—H. J. Winegar, R. P. Miller and W. M. Kain ABSTRACT: A pressure vessel having an actuating system for advancing and retracting an element, e.g. a piston, slidably into and out of the vessel is provided with means responsive to frictional forces generated by the sliding passage of the element into and out of the vessel to generate a compensating force for opposing the effect of the frictional force on the actuating system.

FIG. 1

INVENTORS J. E. BEROSET
F. J. FUCHS, JR.

BY MARN & JANGARATHIS
ATTORNEYS

FRICTION COMPENSATOR

BACKGROUND OF THE INVENTION

1. Field of the Invention

This invention relates to pressure vessels having elements slidably movable into and out of the vessels, and specifically to friction compensators for such vessels. More particularly, this invention is related to an improvement in fluid systems, for example, fluid systems which are utilized to operate high-pressure fluid vessels of the type having an inner working fluid chamber and one or more outer support fluid chambers. Vessels of this type may be utilized, for containing ultrahigh fluid pressures, for example, in fluid pressure intensifiers (apparatus for increasing the pressure of and for pumping fluid), in fluid pressure amplifiers (apparatus for increasing the pressure of a fluid), and in apparatus wherein an ultrahigh-pressure environment is required for accomplishing some function such as testing or high-pressure metal forming.

2. Description of the Prior Art

Considering briefly the nature and development of the type of pressure vessels which may be served by the present invention, it is known by those having skill in this art that early approaches to the development of vessels capable of withstanding ultrahigh pressures proceeded along the lines of increasing the size and therewith the load-carrying capacity of known pressure vessel designs. Such approaches fell short of the art requirements, however, in that they were limited by the strength of materials available for use, by the unwieldy sizes of vessels of known configuration, which sizes were required by the ultrahigh stresses, and by the relatively high expense involved in providing complex stress-relieving structural arrangements.

More recent pressure vessels, which have been capable of supporting ultrahigh pressures, have utilized a body of pressurized fluid surrounding and acting upon an inner cylinder to support or assist the inner cylinder in supporting a body of pressurized working fluid. In such vessels, support fluid for acting upon the inner cylinder to assist in supporting the pressure of the working fluid ordinarily has been pressurized by a pressure amplifier mounted externally of the vessel. The working fluid, however, ordinarily has been pressurized by a reciprocable piston or plunger extending directly into the working fluid chamber defined by the inner cylinder.

Generally, both the support fluid pressure amplifier and the reciprocable piston for pressurizing the working fluid have been powered by a common actuating fluid system so that a predetermined relationship between the pressure in the working fluid and the pressure in the support fluid is established and maintained at all times. In other words, by utilizing a common body of fluid to actuate the pressurizing apparatus for both the support fluid and the working fluid, it is theoretically insured that increases or decreases in the pressure of the working fluid are accompanied by proportional increases or decreases in the pressure of the support fluid so that at any time in the operating cycle of the apparatus, the pressure of the support fluid is neither insufficient nor too great for assisting the inner cylinder in supporting the working fluid pressure.

Obviously, neither excessive nor insufficient support fluid pressure is desirable, since support fluid pressures which are either greater or less than those required to assist the inner cylinder in supporting the working fluid pressure may cause undesirable deformation of the inner cylinder, work hardening of the inner cylinder material and, ultimately, catastrophic failure of the inner cylinder by implosion if the support fluid pressure is excessive, or by explosion if the support fluid pressure is insufficient. It can be seen, therefore, that proper coordination of support fluid pressure and working fluid pressure is a primary consideration in operating ultrahigh pressure vessels of the type utilizing support fluid.

In this regard a problem which has been experienced in those apparatus wherein the working fluid is pressurized by a reciprocable piston or plunger extending into the working fluid chamber defined by the inner cylinder and where both the reciprocable piston and the apparatus for generating pressure in the support fluid are actuated by a common actuating fluid system, is that the pressure in the actuating fluid system has not, at all times during the operation of the apparatus, accurately reflected the pressure of the working fluid.

The source of the inaccuracy in the relationship between the pressure in the actuating fluid system and pressure in the working fluid has been found to be the frictional force generated by the sliding engagement between the reciprocable piston or plunger and seal structure which precludes leakage of fluid from the working fluid chamber. Such frictional force has been found either to add to, during piston advancement, and subtract from, during piston retraction, the force on the piston or plunger generated by the pressure of the working fluid acting thereon. The resultant force is supported by the pressure of the fluid in the actuating fluid system. Thus, where such frictional forces occur, the pressure in the actuating fluid system is not a direct indication of the true pressure within the working fluid chamber. Rather, the pressure in the actuating fluid system reflects both the effect of the pressure within the working fluid chamber and the frictional force generated by reciprocating movement of the piston.

The difficulties presented by the effect of frictional forces are clear. For example, if the pressure in the actuating fluid system is such as to indicate a particular pressure in the working fluid when, in actuality, the pressure of the working fluid when, in actuality, the pressure of the working fluid is more or less than the indicated pressure, the pressure generated in the support fluid will be other than that required to support the inner cylinder against the working fluid pressure and, as discussed above, undesirable deformation or failure of the inner cylinder may occur.

SUMMARY OF THE INVENTION

The present invention overcomes the above-discussed problems by providing, in a pressure vessel having an actuating system for advancing and retracting an element slidably into and out of the vessel, a means responsive to frictional forces generated by the sliding passage of the element into and out of the vessel to generate a compensating force for opposing the effect of the frictional force on the actuating system. For example, the present invention may embody a seal friction compensator for use with a fluid-actuated, fluid-supported high-pressure vessel having a piston means slidably extending into the vessel through a sealed bore, the compensator comprising means responsive to the frictional forces generated by the sliding passage of the piston means through the sealed bore to generate a compensating force, substantially equal in magnitude and opposite in direction to the frictional force, for compensating for the effect of the frictional force on the fluid actuating system of the high pressure vessel.

BRIEF DESCRIPTION OF THE DRAWINGS

A more complete understanding of the present invention may be had from a consideration of the following detailed description thereof when read in the light of the accompanying drawings, wherein.

DETAILED DESCRIPTION

Figure 1:
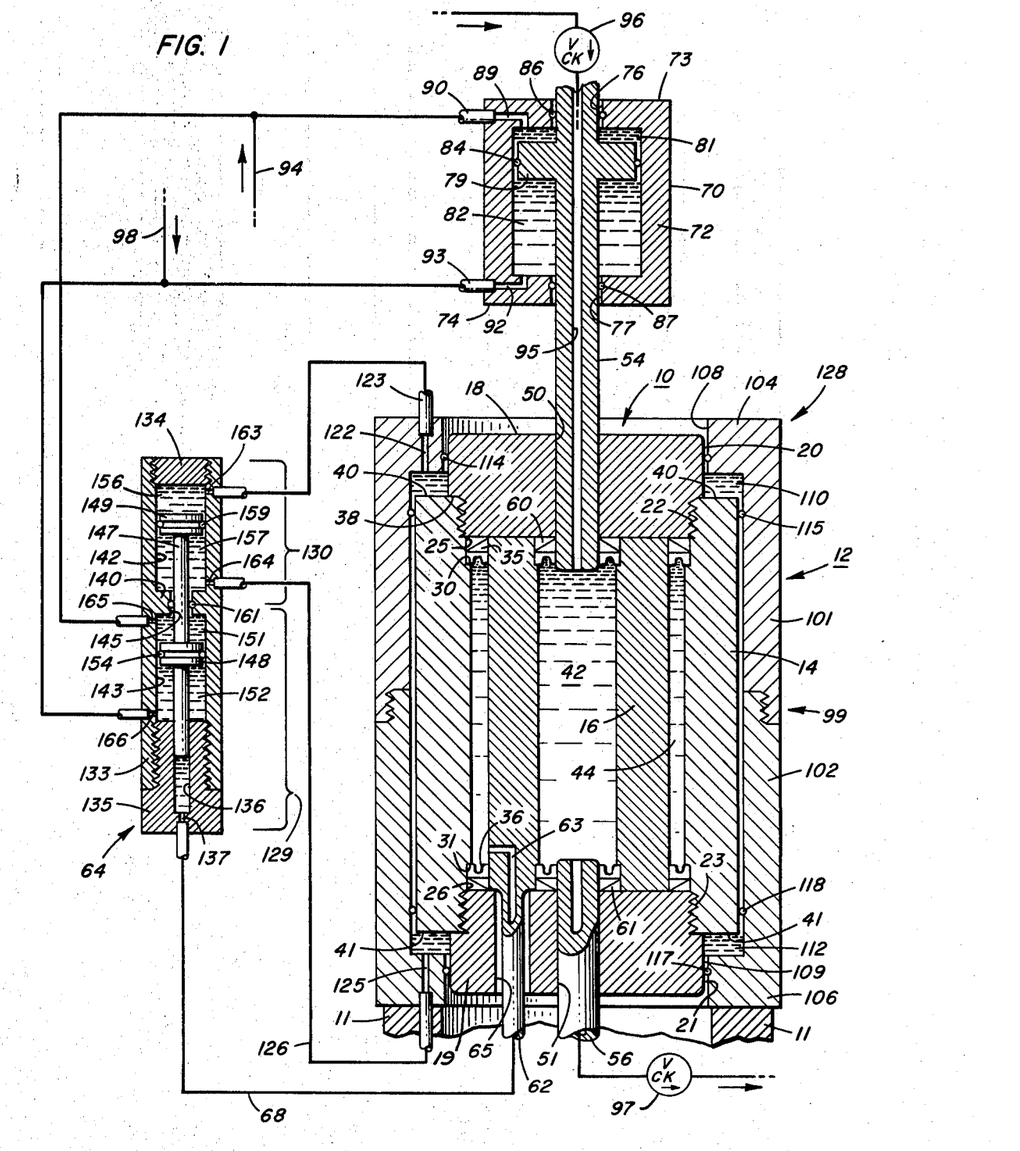
FIG. 1 is a cross-sectional elevational view of a high-pressure vessel provided with a seal-friction compensator apparatus in accordance with the present invention.

Considering the present invention in detail and referring in particular to FIG. 1, a high-pressure vessel, in use as a fluid-pressure intensifier and designated generally by the reference numeral 10, is provided with a seal friction compensator designated generally by the reference numeral 12.

As discussed above, high-pressure vessels of the type under consideration may be utilized inter alia as fluid-pressure intensifiers, fluid-pressure amplifiers and as apparatus for establishing and maintaining a high-pressure environment in which to conduct a function such as testing or high-pressure metal forming. In this regard, it is to be recognized that although vessel 10 is disclosed in use as a fluid-pressure intensifier, the discussion with respect thereto is equally appropriate for like pressure vessels in other uses, e.g. as fluid-pressure amplifiers or other apparatus.

Pressure vessel 10 comprises an outer main support member, such as outer 14, a central support member, such as inner cylinder 16, which is positioned concentrically within but spaced from outer cylinder 14, and top and bottom end plugs 18 and 19 respectively. End plugs 18 and 19 are generally cylindrical and have outer circumferential surfaces 20, 21 and threaded portions 22 and 23 respectively, the basic diameters of which threaded portions are smaller than the basic diameters of outer surfaces 20, 21 and substantially equal to the diameters of annular channels 25 and 26 provided at the upper and lower ends of the inner surface of cylinder 14 as seen in FIG. 1. Channels 25, 26 are threaded for receiving the threaded portions 22, 23 of end plugs 18, 19 respectively, and are provided with shoulders 30, 31 at their inner ends for accommodating high-pressure seals 35 and 36 respectively. Radially extending shoulder surfaces 38, 39 are provided on plugs 18, 19 between outer surfaces 20, 21 and threaded portions 22, 23. These shoulders cooperate with the upper and lower surfaces 40, 41 of outer cylinder 14 to limit the insertion of plugs 18 and 19 into the cylinder and to provide a snug, surface-to-surface engagement between the end plugs 18, 19 and the outer cylinder 14.

Inner cylinder 16 extends from the bottom surface of top plug 18 to the top surface of bottom plug 19 and cooperates with the top and bottom plugs to define a first or working fluid chamber 42 for containing a working fluid. Additionally, inner cylinder 16 cooperates with top and bottom end plugs 18, 19, and outer cylinder 14, to define a second or support fluid chamber 44 for containing a support fluid. Ring seals 35, 36, which may be of any of the high-pressure types known in the art, e.g., the generally U-shaped Teflon cup seal with antiextrusion rings as shown, are provided at the upper and lower surface of support fluid chamber 44. Upper seal 35 is received within an annular groove defined by the cooperation of channel 25 and shoulder 30 of outer cylinder 14 with the lower surface of end plug 18, and lower seal 36 is received within an annular groove defined by the cooperation of channel 26 and shoulder 31 of outer cylinder 14 with the upper surface of bottom end plug 19. Seals 35 and 36 are sized so as to tightly engage the outer surface of inner cylinder 16, the surface of channels 25, 26 respectively, and the respective inner surfaces of end plugs 18, 19 to preclude the leakage of support fluid out of second or support fluid chamber 44.

Top and bottom plugs 18, 19 are provided with centrally disposed, longitudinally axially extending through bores 50, 51 respectively. Slidably received in through bore 50 in top plug 18 is a reciprocable main piston 54. In a similar manner, there is slidably received in through bore 51 in bottom plug 19 a discharge pipe 56 for discharging working fluid from working fluid chamber 42. Main piston 54 and pipe 56 are of equal diameters and are sized so as to at all times extend partially into working fluid chamber 42. Thus, the outer surface of main piston 54 cooperates with the inner surface of inner cylinder 16 and the bottom surface of top plug 18 to define an annular channel for receiving an upper ring seal 60. Similarly, the outer surface of pipe 56 cooperates with the inner surface of inner cylinder 16 and the top surface of bottom plug 19 to define an annular channel for receiving a lower ring seal 61. Ring seals 60, 61 which may be of the same type as seals 35, 36, i.e. the generally U-shaped Teflon cup seal with antiextrusion rings as shown, prevent the leakage of working fluid from working fluid chamber 42 either past main piston 54 and pipe 56, or past inner cylinder 16 into support fluid chamber 44.

Inner cylinder 16 is provided with an integrally formed dependent pipe portion 62 having a passage 63 therein, which passage extends upwardly with inner cylinder 16 and thereafter, from a point radially adjacent support fluid chamber 44, radially outwardly through the outer surface of the inner cylinder. Passage 63 accommodates the introduction of support fluid pressure from a pressure amplifier which is designated generally by the reference numeral 64, to support fluid chamber 44. The lower end of pipe 62 extends through a bore 65 formed in bottom plug 19, whereafter pipe 62 is operably connected to a fluid line 68 leading to the high-pressure discharge side of pressure intensifier 64.

The positioning of passage 63 within pipe portion 62 and inner cylinder 16 provides the pressure vessel 10 with a lower incidence of stress concentrations thereby allowing the overall size of the vessel structure to be minimized. In this regard, a complete disclosure of such pressure vessel structure is contained in the copending application of J. W. Archer et al., Ser. No. 652,112 now U.S. Pat. No. 3,490,344 which was filed on Jul. 10, 1967 and assigned to the same assignee as the present invention.

Main piston 54 extends upwardly from working fluid chamber 42 through bore 50 in top plug 18 and thereafter through a main fluid motor 70 mounted externally of pressure vessel 10. Main fluid motor 70 comprises an outer cylindrical wall 72 which is closed at its upper and lower ends by transverse walls 73, 74, respectively, to define a chamber therein. Centrally disposed, longitudinally axially extending bores 76, 77 are provided in transverse walls 73 and 74, respectively, to accommodate the sliding extension of piston 54 therethrough. Formed on piston 54 within the chamber of main fluid motor 70 is an actuator piston 79. Actuator piston 79 is of a diameter which is substantially equal to the inside diameter of cylindrical wall 72 and cooperates therewith to define an advance fluid chamber 81 thereabove, and a retraction fluid chamber 82 therebelow. An O-ring seal 84, mounted in a suitable channel on the peripheral surface of actuator piston 79, establishes a fluid-tight seal between actuator piston 79 and the inner surface of outer cylindrical wall 72 so as to prevent fluid communication between advance fluid chamber 81 and retraction fluid chamber 82. Similarly, suitable seals 86, 87, e.g. O-ring seals, are provided in annular channels formed in bores 76, 77, respectively, to preclude leakage of fluid from advance fluid chamber 81 and retraction fluid chamber 12 around the surface of piston 54.

Formed in the upper transverse wall 73 of main fluid motor 70 is a passage 89 which communicates advance fluid chamber 81 with an advance fluid line 90 which is connected to fluid line 94 leading from a source of advance fluid (not shown). Similarly, formed in lower transverse wall 74 of main fluid motor 70 is a passage 92 which communicates retraction fluid chamber 82 with a retraction fluid line 93 which is connected to a fluid line 98 leading from a source or retraction fluid (not shown).

Formed centrally of piston 54 is a longitudinally axially extending bore 95 which communicates working fluid chamber 42 with a source of working fluid (not shown). The flow of working fluid through bore 95 is restricted to flow only into working fluid chamber 42 by a check valve 96 mounted in the upper end of bore 95. Thus, during the operation of pressure vessel 10 as a pump or intensifier as discussed below, chamber 42 is charged with fluid through valve 96 and bore 95 in piston 54, and thereafter the fluid is discharged through pipe 56 which is also provided with a check valve 97 to allow the flow of fluid out of chamber 42 through pipe 56 while precluding the entry of fluid from pipe 56 to working fluid chamber 42.

As is shown in FIG. 1, pressure vessel 10 is enclosed and loosely supported by a mounting cylinder, designated generally by reference numeral 99 which is securely mounted on a rigid support 11. Mounting cylinder 99 comprises an upper cylindrical section 101 which is in threaded engagement with a lower cylindrical section 102. Formed on the upper end of upper cylindrical section 101 is a radially inwardly extending flange 104. Similarly, formed on the lower end of lower cylindrical section 102 is a radially inwardly extending flange 106. The inner circumferential surfaces 108, 109 of flanges 104, 106 are of a diameter substantially equal to the diameters of circumferential surfaces 20, 21 of top and bottom plugs 18, 19, and cooperate therewith to establish a longitudinal sliding engagement between vessel 10 and mounting cylinder 99. The inside diameters of upper and lower cylindrical sections 101, 102 are substantially equal to the outside diameter of outer cylinder 14 and establish a longitudinal sliding engagement therewith.

The lower surface of upper flange 104, the circumferential surface 20 of top plug 18, the inside surface of mounting cylinder 99 and the upper surface 40 of outer cylinder 14 cooperate to define a first annular fluid chamber 110. Similarly, the upper surface of lower flange 106, the circumferential surface 21 of bottom plug 19, the inside surface of mounting cylinder 99 and the bottom surface 41 of outer cylinder 14 cooperate to define a second annular fluid chamber 112.

First fluid chamber 110 is sealed against leakage around top plug 18 by a seal 114 mounted in an annular channel formed in the inner circumferential surface 108 of upper flange 104, and is also sealed against leakage around outer cylinder 14 by a seal 115 mounted in an annular channel formed in the inner surface of upper cylindrical section 101. Second annular fluid chamber 112 is sealed against leakage therefrom around bottom plug 19 by a seal 117 mounted in an annular channel formed in the inner circumferential surface 109 of lower flange 106, and also is sealed against leakage around outer cylinder 14 by a seal 118 mounted in an annular channel formed in the inner surface of lower cylindrical section 102.

First annular fluid chamber 110 is in communication with pressure amplifier 64 through a passage 122 in upper flange 104 and a fluid line 123 extending from passage 122 to amplifier 64. Second annular fluid chamber 112 is also in communication with pressure amplifier 64 through a passage 125 in lower flange 106 and a fluid line 126 extending from passage 125 to amplifier 64. As is discussed below, pressure vessel 10 is movable within mounting cylinder 99 to pressurize the fluid within chambers 110 and 112 in response to the frictional forces between piston 54 and seal 60. Vessel 10 and cylinder 99 define a sensing fluid motor, designated generally by the reference numeral 128, for sensing the frictional forces generated between the piston 54 and seal 60 and for transmitting a pressure signal indicative of the sensed forces to a compensator fluid motor, designated generally by the reference numeral 130, which is formed as a part of fluid pressure amplifier 64 and which is provided to exert a controlling force in fluid pressure amplifier 64.

Fluid pressure amplifier 64 is a dual motor amplifier comprising a support fluid motor designated generally by the reference numeral 129, in tandem with compensator fluid motor 130. More specifically, fluid pressure amplifier 64 comprises a generally cylindrical casing 133 being closed at one end by a first sealed threaded end plug 134 and at the other end by a second sealed threaded end plug 135.

Second threaded end plug 135 is a longitudinally axially deep plug having a bore 136 extending longitudinally axially from the upper end for substantially the entire depth thereof. The lower end of end plug 135 is in communication with bore 136 through a passage 137 which accommodates the connection of fluid line 68 from support fluid chamber 44.

Disposed substantially centrally of casing 133 is a transversely extending partition 140 which serves to divide the internal volume of casing 133 into an upper chamber 142 and a lower chamber 143. Transversely extending partition 140 is provided with a centrally disposed, longitudinally axially extending through bore 145 which communicates upper chamber 142 with lower chamber 143. Slidably received through bore 145 is a piston rod 147 which extends from bore 136 formed in end plug 135, through lower chamber 143 and bore 145 into upper chamber 142. That portion of piston rod 147 which extends into bore 136 defines an intensifier piston for pressurizing the fluid in support fluid chamber 44 through passage 63 and fluid line 68. Mounted in (or formed integrally with) piston rod 147 are a support piston 148 and a compensator piston 149.

Support fluid piston 148 on piston rod 147 is positioned within lower chamber 143 and is of a diameter substantially equal to the inside diameter of cylindrical casing 133 so as to divide lower chamber 143 into an upper or advance fluid section 151 and a lower or retraction fluid section 152. The peripheral surface of support fluid piston 148 is provided with a ring seal 154 so as to prevent the communication of fluid around piston 148 between advance fluid section 151 and retraction fluid section 152. Compensator piston 149 on piston rod 147 is positioned within upper chamber 142 and is of a diameter substantially equal to the inside diameter of cylindrical casing 133 so as to divide upper chamber 142 into an upper or booster fluid section 156 and a lower or retarding fluid section 157. The peripheral surface of compensator piston 149 is provided with a ring seal 159 so as to prevent the communication of fluid around piston 149 between booster fluid section 156 and retarding fluid section section 157. The communication of fluid between retarding fluid section 157 and advance fluid section 151 around piston rod 147 is prevented by a ring seal 161 mounted in an annular channel formed in the surface of bore 145.

Formed in generally cylindrical casing 133 are four radially extending fluid passages 163, 164, 165 and 166. Fluid passage 163 accommodates the communication of booster fluid section 156 with fluid line 123 and therethrough to first annular fluid chamber 110. Fluid passage 164 accommodates the communication of retarding fluid section 157 with fluid line 126 and therethrough ultimately to second annular fluid chamber 112. Fluid passage 165 accommodates the communication of advance fluid section 151 with fluid line 90 and therethrough ultimately to advance fluid chamber 81 of main fluid motor 70. Finally, fluid passage 166 accommodates the communication of retraction fluid section 152 with fluid line 93 and therethrough ultimately to retraction fluid chamber 82 of main fluid motor 70.

Figure 2:
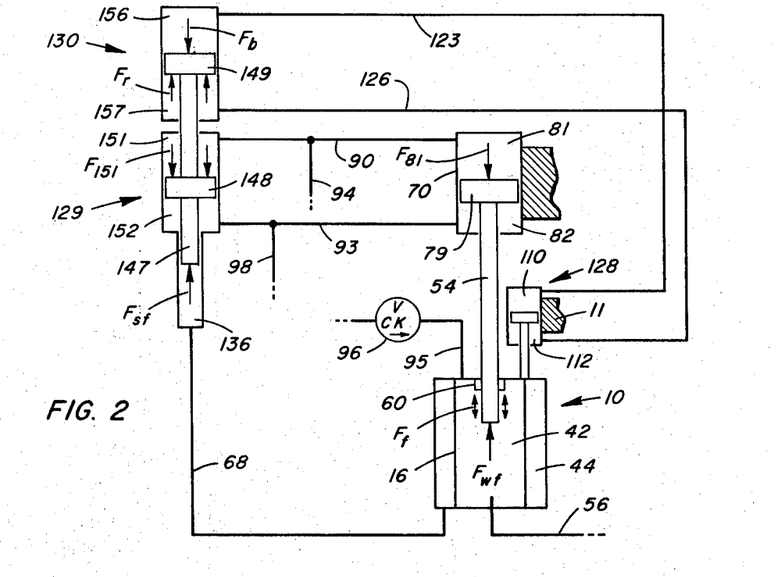
FIG. 2 is a schematic diagram of the vessel of FIG. 1, showing the forces exerted on the various apparatus elements during the operation of the apparatus of FIG. 1.

The operation of fluid pressure intensifier 10 can best be described with reference to FIG. 2 which is a schematic diagram of the vessel of FIG. 1. With regard to FIG. 2, sensing fluid motor 128 is shown, for purposes of description as a fluid motor independent of the structure of pressure vessel 10 rather than as a concentric fluid motor having pressure vessel 10 for a piston as is actually shown in FIG. 1. Additionally, support fluid motor 129 and compensator fluid motor 130, which are shown in FIG. 1 as being integral to define fluid pressure amplifier 64, are shown in FIG. 2 as being separate fluid motors connected by a common piston rod. Finally, bore 95 and check valve 96 through which working fluid is introduced to working fluid chamber 42 and which are shown in piston 54, are shown in FIG. 2 for descriptive purposes as being independent structure. In all other respects, however, the schematic presentation of FIG. 2 corresponds to the structure of FIG. 1.

In the operation of fluid pressure intensifier 10, and referring primarily to FIG. 2, working fluid chamber 42 is filled with fluid, the support fluid system (including chamber 44, passage 63, fluid line 68 and bore 136 of fluid pressure amplifier 64) is filled with fluid, the compensator fluid system (including annular fluid chambers 110, 112, booster fluid section 156, retarding fluid section 157 and their connecting passages and fluid lines) is filled with fluid, advance fluid is introduced to advance fluid chamber 81 of main fluid motor 70 and to advance fluid section 151 of support fluid motor 129 through fluid line 90, and retraction fluid is introduced to retraction fluid chamber 82 of main fluid motor 70 and retraction fluid section 152 of support fluid motor 129 through retraction fluid line 93.

Additional pressurized advance fluid is then introduced to advance fluid chamber 81 and advance fluid section 151 through fluid line 90. This pressurized advance fluid bears upon actuator piston 79 to generate a downwardly directed force $F_{x_1}$ thereagainst. Force $F_{x_1}$ tends to displace actuator piston 79 downwardly, thus causing main piston 54 to increase the pressure in the working fluid chamber 42. Thereafter, the continued exertion of force $F_{x_1}$ displaces main piston 54 into chamber 42 to discharge the working fluid through discharge line 56.

Concurrently with the increase of the pressure of the working fluid in chamber 42, the pressure of the support fluid in chamber 44 is also increased by the action of advance fluid in advance fluid section 151 exerting pressure on support fluid piston 148 to generate a downwardly directed force $F_{151}$ thereagainst. Force $F_{151}$ tends to displace piston rod 147 downwardly within bore 136 so as to increase the pressure of the fluid therein, which pressure increase is transmitted to support fluid chamber 44 through fluid line 68 and passage 63 so as to generate support fluid pressure in chamber 44 to assist inner cylinder 16 in supporting the ultrahigh fluid pressures within working chamber 42. In this regard and as mentioned above, in order for the support fluid in chamber 44 properly to assist inner cylinder 16 in supporting the load exerted thereon by the pressure of the working fluid in chamber 42, the support fluid pressure should be maintained at a predetermined ratio with respect to the pressure of the working fluid. To this end, the areas of piston 79 and 148 are sized so as to generate forces $F_{x}1$ and $F_{151}$, acting through main piston 54 and piston rod 147 respectively, generate pressures in the working fluid and support fluid which are at the predetermined ratio desired to accomplish proper operation of the apparatus; i.e., the pressurized support fluid in chamber 44 acting radially inwardly against the outer surface of cylinder 16 generates a radially inwardly acting force substantially equal to the radially outwardly acting force generated by the pressurized working fluid in chamber 42 acting radially outwardly against the inner surface of cylinder 16. Thus, the inner cylinder 16 is relieved of substantially all hoop stresses, either tensile or compressive.

The desired force relationship during the advance stroke of main piston 54 may be expressed by the equation:

$$F_{81} = KF_{151} \quad (1)$$

where K is a constant which reflects the desired differential between the pressures of the support and working fluids and the differential between the transverse cross-sectional areas of main piston 54 and piston rod 147 which are directly exposed to the working fluid and support fluid respectively.

Force $F_{x_1}$ acting through main piston 54 theoretically generates a force $F_{wf}$ against the working fluid which is equal in magnitude to $F_{x_1}$. Similarly, the force $F_{15}$, acting through support piston rod 147 generates a force $F_{sf}$ against the support fluid which is substantially equal to force $F_{151}$. Thus, the desired force relationship as expressed by equation (1) for the advance stroke of main piston 54 also may be rewritten as follows:

$$F_{wf} = KF_{sf} \quad (2)$$

Upon the completion of the advance stroke, main piston 54 is retracted by introducing retraction fluid through line 93 to retraction fluid chamber 82 while relieving the pressure on the fluid in advance fluid chamber 81. Concurrently with the introduction of retraction fluid to chamber 82 in main fluid motor 70, retraction fluid is also introduced to retraction fluid section 152 of support fluid motor 129 so as to relieve the pressure of the support fluid in support fluid chamber 44 since, during the retraction of main piston 54, there is no fluid pressure load in working chamber 42. Also during the retraction of main piston 54, a new charge of working fluid is introduced to chamber 42 through bore 95 in piston 54 (FIG. 1 and also shown schematically in FIG. 2) and check valve 96.

Considering now, with reference to FIG. 2, the specific nature of the problem caused by piston seal friction which attends the operation of the pressure intensifier of FIG. 1, it can be seen that during the advancement of piston 54, the load to be overcome by the advance fluid acting against actuator piston 79, viz. $F_{x_1}$, is not equal to the working fluid force $F_{wf}$ and the force required to overcome frictional force $F_{f}$ caused by the surface-to-surface engagement of piston 54 with seal 60. Thus, the force of the advance fluid $F_{x_1}$ on main piston 54 is greater than the force $F_{wf}$ of the working fluid on main piston 54 by an amount equal to the frictional force $F_{f}$. Conversely, at the completion of the advance stroke of main piston 54 and at the commencement of the retraction of main piston 54, the pressure of the working fluid is still high and tends to expel main piston 54 from chamber 42. Thus, at this stage of the cycle, the force $F_{wf}$ generated by the pressure of the working fluid against piston 54 is supported by the actuator fluid in chamber 81 bearing against piston 79, i.e. force $F_{x_1}$. In this case, however, the friction between piston 54 and seal 60 generates a force $F_{f}$ which tends to hold the piston 54 within chamber 42, or in other words, to assist the actuator fluid force $F_{x_1}$ in supporting piston 54 against expulsion, thus rendering the actually required force $F_{x_1}$ less than $F_{wf}$ by an amount equal to the force $F_{f}$. During the advance stroke of piston 54, therefore, the actuator fluid force can be expressed as follows:

$$F_{x_1} = F_{wf} - F_f \quad (3)$$

wherein $F_{wf}$ is the upwardly directed force generated by the working fluid in chamber 42 bearing against the lower surface of main piston 54, and $F_f$ is the frictional force between seal 60 and piston 54 tending to resist the advance of piston 54 into chamber 42.

At the completion of the advance stroke 54 and at the commencement of retraction, i.e. where downward movement of piston 54 has stopped and the pressure in working fluid chamber 42 is still high, the actuator fluid force can be expressed as follows:

$$F_{x_1} = F_{wf} + F_f \quad (4)$$

wherein $F_{wf}$ is again the upwardly directed force generated by the working fluid in chamber 42 which is tending to expel piston 54 from chamber 42, and $F_f$ is the frictional force between seal 60 and piston 54 tending to resist the expulsion of piston 54 from chamber 42. Thus, during advance of piston 54, it can be seen that the force $F_{x_1}$ does not accurately reflect and, in fact is greater than the force generated by the working fluid $F_{wf}$ by a factor equal to the frictional force $F_f$. Similarly, at the completion of the advance of piston 54, force $F_{x_1}$ is less than the force $F_{wf}$ generated by working fluid by an amount equal to the piston-seal friction force $F_f$.

Relating the effect of the piston-seal friction force $F_f$ during an intensification cycle as discussed above, to the pressure of the fluid in support fluid chamber 44, it was noted above that proper support for the inner cylinder 16 occurs when equation (2) is satisfied, i.e. when:

$$F_{wf} = KF_{sf} \quad (2)$$

It was also noted above that the same actuator fluid which exerts pressures on piston 79 in chamber 81 also exerts pressure on piston 148 in chamber 151. Thus, any change in the force exerted on piston 79, $F_{x_1}$, is reflected by a proportionate change in the force $F_{151}$ exerted on piston 148. Or, as was stated above, $$KF_{sf} = F_{151} - F_r \quad (1)$$

In that pressure amplifier 64 pressurizes rather than displaces fluid, the frictional forces within pressure amplifier 64 can be considered to be negligible. Thus, it may be said that, in the absence of compensation, the force $F_{151}$ generated by the actuator fluid against piston 148 is always equal to the force $F_{sf}$ generated by the support fluid against piston rod 147. Thus, it may also be said that:

$$F_{sf}=F_{151} \quad (5)$$

Substituting equation (5) into equation (2) it may be said that the desired support for inner cylinder 16 occurs when:

$$F_{wf}=KF_{151} \quad (6)$$

and since $KF_{15}$ is equal to $F_{81}$, it again becomes clear that the desired support for inner cylinder 16 occurs when the force generated by the working fluid $F_{wf}$ is equal to the force against piston 79, $F_{81}$. As is seen from equations (3) and (4), however, such is not the case when piston 54 is moving or tending to move with respect to seal 60. More specifically, when $F_{81}$ is greater than $F_{wf}$ i.e. during piston advance, equation (3) above; $F_{151}$ is greater than that force actually required to generate the desired pressure in the support fluid in chamber 44 and thus the actual pressure generated is in excess of that desired to support inner cylinder 16. As noted above, such an excess causes undesirable deformation of the inner cylinder 16 and may even cause failure of the inner cylinder by implosion.

Conversely, after the advance stroke and upon retraction of piston 54, the force $F_{81}$ is less than that exerted by the working fluid $F_{wf}$ by an amount equal to the piston-seal friction force $F_f$, equation (4). Thus, in such a situation, $KF_{151}$ is less than the force actually required to generate the desired pressure in the support fluid in chamber 44 and thus, the actual support pressure generated is less than that desired to support inner cylinder 16. As noted above, such a reduction in support fluid pressure causes undesirable deformation of the inner cylinder 16 and may even cause failure of the inner cylinder by explosion.

The present invention overcomes the deformation and failure tendency of inner cylinder 16 as discussed above, by the provision of piston-seal compensator apparatus, including fluid motor 128 of FIG. 2, for sensing the amount of friction force $F_f$ generated by the seal-piston friction and for transmitting the sensed friction force to exert a controlling or corrective force on a compensating fluid motor, e.g. the fluid motor 130 of FIG. 2, for generating a force component in the support fluid system (as shown), or to a fluid motor operatively connected to the main fluid motor for generating a force component in the working fluid system (not shown), which force component in either situation is equal in magnitude and opposite in direction to the effect of the seal-piston frictional force component. The apparatus for sensing the amount of friction load generated comprises a means for sensing the tendency of the pressure vessel to be displaced by the frictional forces.

Referring again to FIG. 1, therefore, it can be seen that pressure vessel 10 is slidably mounted on discharge pipe 56 and slidably received within stationary mounting cylinder 99. Thus, as piston 54 is advanced into chamber 42 so as to pressurize and discharge working fluid through discharge pipe 56, frictional force $F_f$ (FIG. 2) is generated between piston 54 and seal 60 which tends to displace the pressure vessel 10 downwardly over discharge pipe 56 and then within the stationary mounting cylinder 99. Since mounting cylinder 99 is fixed, the tendency of pressure vessel 10 to move downwardly within mounting cylinder 99 also tends to exert a pressure in the fluid in second annular fluid chamber 112 which comprises one chamber of sensing fluid motor 128. The pressure exerted on the fluid in chamber 112 is transmitted through passage 125, fluid line 126 and passage 164 to the retarding fluid section 157 of compensator fluid motor 130, and exerts an upwardly directed retarding force $F_r$ (FIG. 2) against compensator piston 149. Force $F_r$ is of a magnitude which is equal or substantially equal to that portion of the force acting on piston 148 which is generated by the piston-seal friction, viz. $F_f/K$. It can be seen, therefore, that at this stage of the operation, i.e. during the advancement of piston 54, advance fluid in the advance fluid section 151 of support fluid motor 129 is exerting a force $F_{151}$ (FIG. 2) on piston 148, which is tending to displace support fluid piston 148 and therewith piston rod 147 downwardly, whereas the fluid in the retarding fluid section 157 of compensator fluid motor 130 is exerting a force $F_r$ (FIG. 2) which is tending to displace compensator piston 149 and therewith piston rod 147 upwardly. The net effect of the opposed forces acting on piston rod 147, i.e. the downwardly directed force $F_{151}$ generated by the advance fluid which reflects both the force $F_{wf}$ generated by the working fluid pressure and the seal-piston friction force $F_f$, and the upwardly directed force $F_r$ generated by the fluid in retarding fluid section 157, which reflects the seal-piston friction load, is that the forces generated in response to seal-piston friction are effectively cancelled, and the support fluid in support fluid chamber 44 is pressurized by a force $F_{sf}$ which is related solely to the magnitude of the pressure of the working fluid in chamber 42. The foregoing analysis of the opposed forces acting on piston 147 may also be stated:

$$F_{sf}=F_{151}-F_r \quad (7)$$

which, since $F_{151}=F81/K$ by equation (1), may be written $$KF_{sf}=F_{81}-r \quad (8)$$

Since, from equation (3) $F_{81}$ is equal to $F_{wf}+F_f$, then equation (8) may be rewritten:

$$KF_{sf}=F_{wf}+F_f-KF_r \quad (9)$$

and since $F_f$ is equal to $KF_r$, equation (9) becomes:

$$KF_{sf}=F_{wf} \quad (2)$$

which as was discussed above, corresponds to the desired force balance situation for having support fluid in chamber 44 properly assist inner cylinder 16 in supporting the load generated by the working fluid in chamber 42.

Thus, by compensating for the seal-piston friction load by a force which is equal and opposite to the effect thereof, the pressure in support fluid chamber 44 is maintained in the desired relationship to the pressure in working fluid chamber 42 notwithstanding the occurrence of piston-seal friction and the above-described disadvantageous deformation and failure of the inner cylinder 16 is obviated.

Upon the completion of the advance of piston 54, the introduction of advance fluid to advance fluid chamber 81 is stopped, the pressure in chamber 42 is reduced and valve 97 in discharge line 56 closes so as to isolate the intensifier for recharging. In this situation, the working fluid is tending to expel piston 54 from chamber 42 and as such is tending to exert a pressure on the advance fluid in advance fluid chamber 81 through piston 79. The magnitude of the force $F_{81}$ transmitted through piston 54 to piston 79 for exerting a pressure on the advance fluid in chamber 81 is less than that $F_{wf}$ exerted on piston 54 by the working fluid by an amount equal to the seal-piston friction $F_f$ between piston 54 and seal 60, equation (4). Thus, since the advance fluids in chamber 81 and in advance fluid section 151 are in communication, and since the establishment of proper pressure in the support fluid in chamber 44 requires that the forces acting on piston rod 147 for pressurizing the support fluid be related to the pressure of the fluid in working chamber 42, the downwardly directed force $F_{151}$ exerted by the advance fluid in advance fluid section 151 of support fluid motor 129, in the absence of compensation, is less than that required to pressurize the support fluid in chamber 44 sufficiently to support inner cylinder 16 without deformation or failure.

As was noted above with respect to the description of the advance of piston 54, however, the friction between seal 60 and piston 54 tends to move pressure vessel 10 within mounting cylinder 99. As piston 54 moves upwardly, the frictional force between seal 60 and piston 54 tends to displace vessel 10 upwardly, thereby tending to pressurize the fluid in first annular fluid chamber 110 which comprises the second chamber of sensing fluid motor 128. The pressure exerted on the fluid in chamber 110 is transmitted through passage 122, fluid line 123 and passage 163 into the booster fluid section 156 of compensator motor 130 so as to generate a downwardly directed force $F_b$ against compensator piston 149. Thus, at the end of an advance stroke by piston 54, and upon the commencement of a retraction stroke, the forces being exerted by fluid pressures within fluid pressure amplifier 64 include downwardly directed force $F_{15}$, by the advance fluid in section 151 against support fluid piston 148, and downwardly directed force $F_b$ against compensator piston 149 by the fluid in booster fluid section 156. Since the force exerted by the advance fluid reflects the force $F_{wf}$ exerted by the pressure of the working fluid in chamber 42 minus the seal-piston frictional force $F_f$, and the force $F_b$ exerted by the pressure of the fluid in booster fluid section 156 also reflects the seal-piston frictional force as sensed by sensing fluid motor 128 and, since both the force $F_b$ on compensator piston 149 and the force $F_{151}$ on support fluid piston 148 are directed downwardly, the forces are additive and the net effect of the combined forces on piston rod 147 is a force which is sufficient to pressurize the fluid in support chamber 44 by an amount which is the desired relationship to the working fluid pressure. Thus, the undesirable tendency of inner cylinder 16 to deform or fail by explosion under these circumstances is eliminated.

The retraction of piston 54 is effected by relieving the pressure in the advance fluid system and introducing fluid to the retraction fluid chamber 82 in main fluid motor 70 through fluid line 92 and passage 92. Concurrently, retraction fluid pressure is introduced to the retraction fluid section 152 of support fluid motor 129 from fluid line 93 through passage 166. The exertion of retraction fluid in this manner can be seen to cause the retraction of piston therewith the introduction of a new charge of working fluid thereto, as well as the exertion of an unopposed, upwardly directed force on support fluid piston 148 and therewith piston rod 147 so as to relieve the support fluid pressure in chamber 44. This situation is maintained until piston 54 is fully retracted at which time the retraction fluid pressure is relieved and advance fluid pressure is again exerted to commence a repetition of the above-described cycle.

It is to be noted that the above discussion of the operation of the apparatus of FIG. 1 has been in terms of introducing a compensating force which is equal and opposite to the force generated by piston-seal friction. It should be recognized, however, that the compensating force need not always be equal to the frictional force so long as it is of sufficient magnitude to prevent undesirable deflection and failure of inner cylinder 16.

The foregoing description directed to the apparatus of FIG. 1, discloses one embodiment of a seal-friction compensator according to the teaching of the invention wherein the tendency to movement of pressure vessel 10 is sensed by a sensing fluid motor 128 which generates a fluid-pressure signal for transmission to a compensator fluid motor 130 which introduces a corrective force directly on a support fluid motor 129 which generates pressure in a support fluid system. It is to be recognized, however, that other embodiments of seal-friction compensator apparatus can be structured in accordance with the present teaching. For example, the apparatus shown schematically in FIG. 3 embodies a seal-friction compensator according to the present teaching wherein the tendency of the pressure vessel to be displaced is measured by a load cell, rather than by a sensing fluid motor as shown in FIG. 1.

Figure 3:
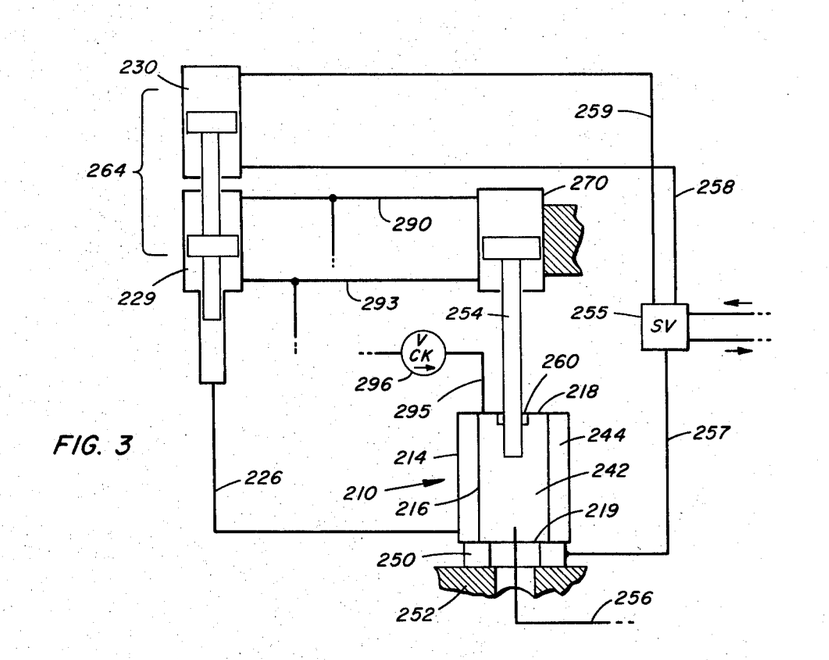
FIG. 3 is a schematic diagram of a pressure vessel provided with another embodiment of seal-friction compensator in accordance with the present invention.

More specifically, and referring to FIG. 3, a pressure vessel designated generally by the reference numeral 210 is shown schematically to comprise an outer cylinder 214, an inner cylinder 216, a top end plug 218 and a bottom end plug 219. Inner cylinder 216, top end plug 218 and bottom end plug 219 cooperate to define a working fluid chamber 242. Similarly, inner and outer cylinders 216, 214, top end plug 218 and bottom end plug 219, cooperate to define a support fluid chamber 244. Extending into working fluid chamber 242 through top end plug 218 is a main piston 254 which is driven reciprocably by a main fluid motor 270. The penetration of main piston 254 through top end plug 218 is sealed against fluid leakage by a high-pressure seal 260.

Similarly to the embodiment of FIGS. 1 and 2, slidably extending into working fluid chamber 242 through bottom end plug 219 is a discharge pipe 256 which is equal in diameter to the diameter of main piston 254.

Working fluid to be pressurized and pumped is introduced through top end plug 218 from a source line 295 having a check valve 296 mounted therein. Support fluid in chamber 244 is pressurized by a support fluid motor 229 which is in communication with chamber 244 through a fluid line 226. As was the case with the apparatus of FIG. 1, a seal friction compensator fluid motor 230 is driven by fluid pressure signals which are related to the forces generated by the friction between main piston 254 and the high pressure seal 260 through which it extends.

The magnitude of the seal friction force generated during the operation of the apparatus of FIG. 3, however, is sensed electrically rather than hydraulically as was the case with respect to the embodiment of FIG. 1. Specifically, pressure vessel 210 is mounted on a load cell 250 which is mounted on a rigid foundation 252. Output signals generated by load cell 240 are transmitted over lead 257 to a servovalve 255 which, in response to the load cell signals, transmits hydraulic pressure signals to compensator fluid motor 230.

The operation of the apparatus of FIG. 3 is exactly the same as that described above with respect to the apparatus of FIG. 1 except for the manner in which seal-friction forces are sensed. Thus, with fluid in all systems, advance fluid is introduced to main fluid motor 270 and support fluid motor 229 through advance fluid line 290. The introduction of advance fluid to main fluid motor 270 displaces main piston 254 downwardly to pressurize and thereafter pump working fluid from chamber 242 through discharge line 256. Additionally, the pressure in the advance fluid exerts a downwardly directed force on the piston of support fluid motor 229 which causes the pressure in the fluid in chamber 244 to be increased so as to assist inner cylinder 216 in supporting the pressure of the fluid in chamber 242. The advance of main piston 254 through the high-pressure seal 260 tends to displace pressure vessel 210 downwardly against load cell 250 thereby generating an electrical signal which is transmitted to servovalve 255 over lead 257. Servo valve 255, in response to the signal from load cell 250, transmits a hydraulic pressure signal to compensator fluid motor 230 through fluid line 258, which pressure signal exerts an upwardly directed force on the piston of compensator fluid motor 230. Since the pressure of the advance fluid in support fluid motor 229 generates a downwardly directed force on the fluid motor piston which reflects both the pressure in working fluid chamber 242 and the seal-friction force generated between plunger 254 and the high-pressure seal 260, and, since the pressure signal from servovalve 255 to compensator fluid motor 230 causes the generation of an upwardly directed force against the piston of compensator fluid motor 230 which reflects only the seal-friction force, the net effect on the output of fluid pressure amplifier 264 is that the upwardly and downwardly directed forces which result from the piston-seal friction, being equal in magnitude and opposite in direction, are eliminated and the output of the amplifier, i.e. the pressure exerted on the support fluid in chamber 244, is properly related to only the working fluid pressure. As such, inner cylinder 216 is properly supported at all times against undesirable deformation and catastrophic failure.

The hydraulic systems shown in FIGS. 1 and 3 are each systems wherein the utility of the pressure vessel, viz a fluid-pressure intensifier, is such that the operation of the apparatus includes frequent pressure changes in the working fluid chamber. Specifically, with each advance and retraction of the main piston, the fluid pressure in the working chamber is increased to a desired operational level, maintained at that operational level during pumping, relieved to recharge the chamber, and thereafter increased once again.

It is to be recognized, however, that the present invention is equally applicable to use of the pressure vessel in situations where the pressure of fluid in the working chamber must be maintained constant notwithstanding relative movement between the main piston and the pressure vessel. Typical of these situations is that where the apparatus is to be used to establish a high-pressure environment within which to conduct a test, and the test procedure requires a cyclical reciprocation of the vessel with respect to the main piston. A situation such as this would occur, for example, in the testing of high-pressure seal structure, e.g. the seal which prevents leakage around the main piston. In such a situation, the compensator of the present invention is utilized to introduce forces into the hydraulic system which are equal to and vectorially opposite the forces generated by seal-piston friction so as to enable the pressure of the support fluid in the support fluid chamber to be maintained at a magnitude which is proper for assisting the inner cylinder in supporting the fluid pressure load within the working fluid chamber.

It is also to be recognized that the compensator fluid motor utilized in the present invention can be positioned so as to exert compensating forces directly upon the main fluid motor rather than on the support fluid motor as is shown in FIGS. 1 and 3. This can be accomplished readily by one skilled in the art, for example by mounting the compensator fluid motor in tandem with the main fluid motor rather than in the same manner as is described above. Thus, it can be seen that by mounting the compensator fluid motor in tandem with the main fluid motor, the friction compensator of the present invention can be used not only to regulate support fluid pressure, but also to insure a desired relationship between working fluid pressure and actuating fluid pressure in situations wherein the pressure vessel being utilized is one which does not provide for support fluid.

It is considered to be manifest that many other modifications and changes can be made to the disclosed embodiments without departing from the spirit and scope of the present invention.

I claim:

1. In an apparatus for pressurizing fluid including: a working chamber for containing working fluid, a support chamber surrounding said working chamber for receiving support fluid, means for pressurizing said working fluid, and means for pressurizing said support fluid, said working fluid and said support fluid having a predetermined pressure-level relationship, the improvement comprising:
   sensing means for sensing any variation in said predetermined pressure level relationship; and
   compensating means responsive to said sensing means for exerting compensating control on said means for pressurizing said support fluid to restore said predetermined pressure level relationship upon the alteration thereof.

2. The improvement according to claim 1 wherein said sensing means comprises a fluid motor.

3. The improvement according to claim 1 wherein said sensing means comprises a load cell.

4. In fluid pressurization apparatus including: a pressure vessel comprising a working fluid chamber for containing working fluid, and a support fluid chamber surrounding said working fluid chamber for containing support fluid; a fluid motor including a piston extending into said working fluid chamber for pressurizing said working fluid; a support fluid motor for pressurizing said support fluid in a predetermined pressure level relationship with respect to said working fluid; and sealing means mounted in said pressure vessel and in sliding engagement with said piston for preventing leakage of said working fluid from said working fluid chamber, the improvement comprising:
   sensing means for sensing frictional forces generated by the sliding engagement of said sealing means with said piston, said frictional forces tending to alter said predetermined pressure level relationship; and
   a compensator fluid motor responsive to said sensing means for exerting controlling force on said support fluid motor to cause said support fluid motor to vary the pressurization of said fluid to restore said predetermined pressure level relationship.

5. The improvement according to claim 4 wherein said sensing means comprises a fluid motor.

6. The improvement according to claim 4 wherein said sensing means comprises a rigidly mounted cylinder surrounding and loosely receiving said pressure vessel and defining in cooperation with said pressure vessel, and associated seals, a plurality of fluid chambers for receiving fluids which fluids are respectively pressurized by movement of said pressure vessel in response to said frictional forces generated by said sliding engagement of said sealing means with said piston.

7. The improvement according to claim 4 wherein said sensing means comprises a load cell.

L-566-PT
(6-69)

UNITED STATES PATENT OFFICE
CERTIFICATE OF CORRECTION

Patent No. 3,572,035      Dated March 23, 1971

Inventor(s) JOHN EDWARD BEROSET - FRANCIS JOSEPH FUCHS, JR.

It is certified that error appears in the above-identified patent and that said Letters Patent are hereby corrected as shown below:

Column 2, line 27 (specification page 4, line 24), delete "when, in actuality, the pressure of the working fluid".

Column 3, line 12 (specification page 7, line 6), after "outer" insert --cylinder--.

Column 6, line 22 (specification page 16, line 8), delete "section" (second occurrence); line 53 (specification page 17, line 14), after "shown in" insert --FIG. 1 as being integral w the structure of--.

Column 7, line 27 (specification page 19, line 10), "$F_81$" should have been --$F_{81}$--.

Column 8, line 3 (specification page 21, lines 9 and 10), after "$F_{wf}$" insert --, but rather it is equal to the sum of fo $F_{wf}$--; line 25 (specification page 22, line 4), in Equation 3, change the minus sign to a plus sign; line 38 (specification p 22, line 15), in Equation 4, change the plus sign to a minus s line 68 (specification page 23, line 15), Equation 1, "$KF_{sf} = F_{151} - F_r$" should have been --$F_{81} = KF_{151}$--.

Column 10, line 18 (specification page 27, line 13), afte "piston" insert --rod--; line 23 (specification page 28, line Equation 8, "$KF_{sf} = F_{81} - _r$" should have been --$KF_{sf} = F_{81} - KF$ Column 11, line 28 (specification page 30, line 20), "flui line 92" should have been --fluid line 93--; line 32 (specific page 30, line 25), after "piston" insert --54 from chamber 42 and--.

Column 12, line 25 (specification page 33, line 14), "cel 240" should have been --cell 250--.

Column 14, line 31 (amendment claim 15, line 17), after "said" (first occurrence) insert --support--.

Signed and sealed this 19th day of October 1971.

(SEAL)
Attest:

EDWARD M. FLETCHER, JR.
Attesting Officer

ROBERT GOTTSCHALK
Acting Commissioner of Pat